Oct. 31, 1950 W. H. JORDAN 2,527,737

VARIABLE FREQUENCY BAND WIDTH AMPLIFIER

Filed Feb. 25, 1944

INVENTOR.
WALTER H JORDAN
BY William D Hall
Attorney

Patented Oct. 31, 1950

2,527,737

UNITED STATES PATENT OFFICE 2,527,737

VARIABLE FREQUENCY BAND WIDTH AMPLIFIER

Walter H. Jordan, Arlington, Mass., assignor, by mesne assignments, to the United States of America as represented by the Secretary of War Application February 25, 1944, Serial No. 523,883

4 Claims. (Cl. 179—171)

Figure 1:
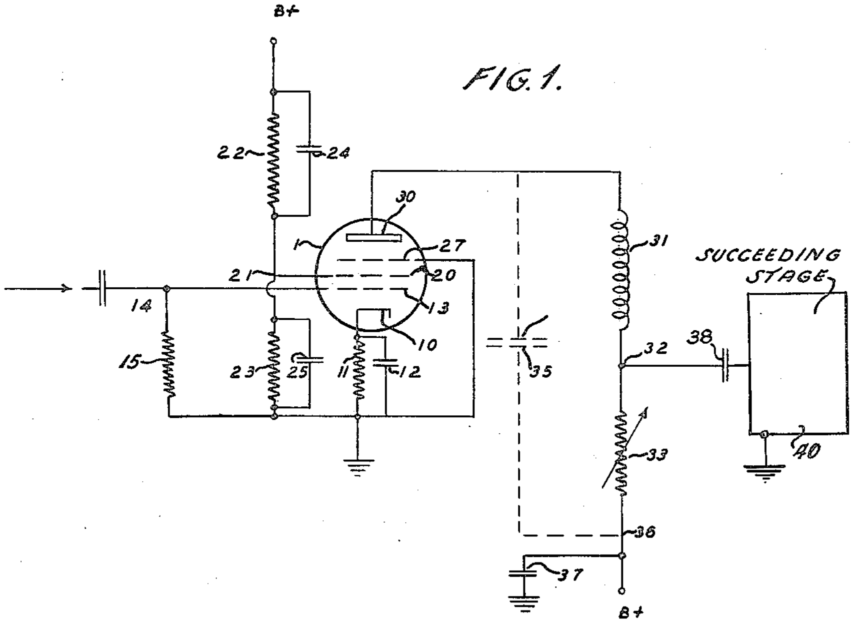

This invention relates to an amplifier and more particularly to an amplifier having a constant gain over a band width of frequencies, with the band width being made adjustable for varying the selectivity of the amplifier.

In the operation of many communication systems, it is necessary to amplify predetermined frequency bands at a substantially uniform gain and to have means for varying the band spread without affecting in a substantial degree the gain of the amplifier. Thus, as one example, there are communication receivers of the superheterodyne type wherein at intermediate frequency of between 10 and 50 megacycles is utilized. Receivers of this type are used in radar and television work and when so used must be able to accommodate video bands of the order of 10 or more megacycles. Under certain conditions it may be desirable to narrow the frequency bands handled without at the same time affecting the gain. The disclosed amplifier, and especially the interstage coupling network accomplish the above purpose.

In addition to the above, ordinary broadcast receivers have amplifiers in which frequencies of 100,000 cycles per second and up are used. Thus intermediate frequency amplifiers may customarily operate at 450,000 cycles per second while the radio frequency stages must handle frequencies of from 550,000 cycles per second up to about 1.5 megacycles. In all these instances, the band width may be anywhere from 5,000 cycles per second up to 10,000 cycles per second and even more.

In the various types of equipment falling in the above classes, a variable band width control, independent of gain per stage, is highly desirable. The disclosed coupling network provides a control of this character in a simple and effective manner. The amplifier embodying the invention herein may operate at any frequency desired above about 100,000 cycles per second.

The invention in general provides an amplifier having a vacuum tube of the so-called constant current type a tetrode or a pentode wherein the space current between cathode and anode is substantially independent of potential difference variations between these two electrodes. The vacuum tube has in its anode circuit a load consisting of a parallel resonant circuit.

The parallel resonant circuit has one branch consisting substantially of pure capacitance with the other branch consisting of inductance and resistance in series. The inductance preferably is connected directly to the anode and has a separate resistance in series thereto; the output potential is taken only across the resistance. The inductance is preferably of the air core type although it is contemplated that cores of molded iron dust may be used.

It is well known that at resonance a parallel resonant circuit has maximum current flowing within the circuit itself. The intensity of these currents is determined by the ohmic resistance of the circuit. In addition, the ohmic resistance also controls the width of the resonant frequency band, the greater the resistance, the wider the band. Since the output voltage is taken across the resistance, it follows that the greater the resistance, the greater the output voltage would be if the current remained constant. However, with added resistance, the intensity of the currents flowing in the circuit is reduced, this being due to the reduced Q of the resonant circuit. I have observed that a variation of this resistance results in a variation of the frequency band with the drop across the resistance tending to balance the change in current flowing in the resonant circuit when the resistance is varied within certain limits.

It is therefore an object of this invention to provide an amplifier having a substantially constant gain over a wide frequency band.

It is also an object of this invention to provide an amplifier which has a tank circuit including a variable resistance with the input circuit of the succeeding stage of the amplifier connected only to this variable resistance, the variation of this resistance permitting to obtain constant gain either over a wide or a narrow band width of frequencies.

Figure 2:
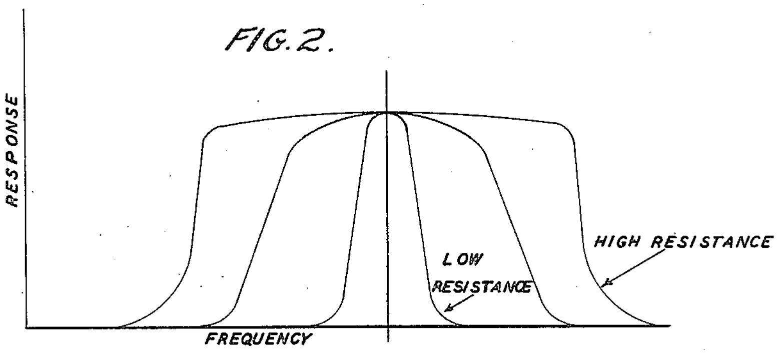

For a detailed description of the invention, reference will now be made to the drawing wherein Fig. 1 shows a circuit diagram of one stage of an amplifier embodying this invention and Fig. 2 shows some frequency response curves for various resistances.

The amplifying stage includes a vacuum tube 1 of the so-called constant current type wherein there is at least one additional grid between the control grid and anode for shielding purposes. A pentode, however, is preferred and this is shown. Vacuum tube 1 has a cathode 10 connected to ground through a suitable bias resistor 11 which may be shunted with a by-pass condenser 12 for proper bias of the control grid. Control grid 13 may have a suitable input 14—15 connected to a source of currents to be amplified. The frequencies may lie within the broad range previously indicated. Pentode 1 has an accelerating grid 20 connected to a point 21 on a voltage divider network consisting of resistances 22 and 23 connected between a source of B+ potential and ground. Each of these resistances is shunted with by-pass condensers 24 and 25 respectively. Resistance 23 may be omitted if desired and reliance had upon space current drawn by the accelerating electrode.

Suppressor grid 27 is maintained at a constant potential preferably lower than that of anode 30 or accelerating grid 20 and may for convenience be grounded. Anode 30 is directly connected to a tank circuit which is a parallel resonant circuit, one branch consisting of inductance 31 connected at junction point 32 with a variable resistance 33 and the other branch consisting of capacitance 35. Terminal 36 of the parallel resonant circuit may be connected to a suitable source of B+ anode potential and may be grounded, as far as alternating currents are concerned, with a by-pass condenser 37. From junction point 32 a blocking condenser 38 feeds the output to any suitable device such as the control grid of a succeeding stage 40.

Capacitance 35, shunting inductance 31 and resistance 33, is shown in dotted lines to indicate that at frequencies of the order of between 10 and 50 megacycles and higher, the distributed capacitance due to wiring and components may be utilized. Thus at such frequencies, inductance 31 may have a value measured in millihenries with capacitance 35 being reduced to as low a figure as possible and of the order of 20 or 30 micro-microfarads. It is understood, of course, that these values are merely illustrative and will depend upon the part of the frequency spectrum in which the amplifier is to operate. Thus at frequencies of one megacycle or lower, capacitance 35 may be a real condenser.

Resistance 33 may have a maximum value up to about 100,000 ohms. In practice the maximum value of this resistance for satisfactory band width control in the region of 20 or 30 megacycles may be several hundred ohms. It is understood, of course, that an excessive value of resistance will not be satisfactory. In general, the resistance must be small compared to the plate resistance of vacuum tube 1 and may have a maximum value of about $\frac{1}{10}$ of the plate resistance. The maximum resistance value may be determined by experiment and gain variation tolerances.

Referring to Fig. 2, the curves show the broadening of the resonance curve with increase of resistance while maintaining the symmetry and amplitude of the response substantially constant.

Referring again to the principle of operation of the amplifier, the Q of the capacitative branch of the circuit, namely condenser 35, may be assumed to be a high constant value. Hence the constant output at junction 32 represents a substantial balance between two opposing tendencies in the inductance branch of the circuit. Thus an increase in resistance 33 reduces the effective Q of this branch of the parallel resonant circuit and the intensity of currents flowing therein. At the same time, the increased resistance tends to raise the IR drop. Inasmuch as the output voltage at junction 32 (the other terminal being naturally the ground) divided by the input voltage at 14 and ground represents the gain, it is clear that a constant output at junction 32 necessarily implies constant gain. This is obtained by connecting the succeeding stage 40 only across resistance 33 rather than the entire tank circuit.

What is claimed is:

1. A wide frequency band amplifier comprising a vacuum tube of the pentode type having a cathode, control grid, accelerating grid, suppressor grid and anode, said control grid and cathode forming an input circuit, means for maintaining substantially constant potentials on said accelerating and suppressor grids, a parallel resonant circuit connected between said anode and a source of anode potential, said parallel resonant circuit having a capacitance in one branch and series-connected inductance and varaible resistance in the other branch, with the inductance being connected directly to the anode, an output circuit connected solely across said resistance, said parallel resonant circuit being resonant to a frequency having a sufficiently high value to make the Q of the inductance a significant factor, and the value of said resistance being adjusted to produce an amplifier having substantially constant gain over the frequency range of said band.

2. A high frequency amplifier comprising a vacuum tube of the constant current type having at least a cathode, a control grid and an anode, said cathode and control grid forming an input circuit, a parallel resonant circuit connected between said anode and a source of anode potential, said parallel resonant circuit having two branches, one branch comprising an inductance connected to said anode and a variable resistance connected between said inductance and said source, and the other branch comprising a capacitance shunting said inductance and said variable resistance, and an output circuit connected substantially solely across said variable resistance, the value of said resistance being selected to make said output circuit to produce a signal substantially uniform over a band of frequencies above and below the resonant frequency of said inductance and said capacitance.

3. A variable band width, constant gain amplifier including a thermionic tube, a tank circuit parallel resonant at the operating frequency of said amplifier connected in the output circuit of said tube, one branch of said tank circuit consisting of an inductance and a variable resistance, and the other branch consisting of a condenser shunting said inductance and resistance, means for adjusting said resistance to vary the Q of said tank circuit, and an input circuit for the succeeding stage of said amplifier connected solely across said resistance.

4. An amplifier as defined in claim 3 in which the value of said resistance is not greater than $\frac{1}{10}$ of plate resistance of said thermionic tube.

WALTER H. JORDAN.

REFERENCES CITED

The following references are of record in the file of this patent:

UNITED STATES PATENTS

| Number | Name | Date |
|---|---|---|
| 2,051,898 | Roberts | Aug. 25, 1936 |
| 2,100,236 | Brown, Jr. | Nov. 23, 1937 |
| 2,196,266 | Landon | Apr. 9, 1940 |
| 2,197,024 | Seeley | Apr. 16, 1940 |
| 2,207,796 | Grundmann | July 16, 1940 |
| 2,213,591 | Plebanski | Sept. 3, 1940 |
| 2,222,043 | Oram | Nov. 19, 1940 |
| 2,268,672 | Plebanski | Jan. 6, 1942 |
| 2,278,801 | Rust et al. | Apr. 7, 1942 |

FOREIGN PATENTS

| Number | Country | Date |
|---|---|---|
| 9511/32 | Australia | Mar. 24, 1933 |